United States Patent [19]

Kirkland

[11] Patent Number: 4,713,692
[45] Date of Patent: Dec. 15, 1987

[54] METHOD AND APPARATUS FOR DERIVING FRAME INTERVAL SIGNALS

[75] Inventor: Robert N. Kirkland, Mitcham, England

[73] Assignee: U.S. Philips Corporation, New York, N.Y.

[21] Appl. No.: 850,634

[22] Filed: Apr. 11, 1986

[30] Foreign Application Priority Data

Apr. 29, 1985 [GB] United Kingdom ................. 8510862

[51] Int. Cl.[4] .............................................. H04N 5/06
[52] U.S. Cl. ..................................... 358/150; 358/148; 370/106; 375/114; 371/47
[58] Field of Search ............... 358/142, 146, 148, 150, 358/153; 370/106; 375/114, 115, 116; 371/47, 70

[56] References Cited

U.S. PATENT DOCUMENTS

| | | | |
|---|---|---|---|
| 4,213,011 | 7/1980 | Hoelzl et al. | 370/106 |
| 4,344,180 | 8/1982 | Cummiskey | 375/116 |
| 4,414,676 | 11/1983 | Kraul et al. | 375/116 |
| 4,587,521 | 5/1986 | Ohta et al. | 358/142 |

FOREIGN PATENT DOCUMENTS

| | | | |
|---|---|---|---|
| 0053819 | 4/1979 | Japan | 358/148 |
| 84/02442 | 6/1984 | PCT Int'l Appl. | |
| 84/02242 | 6/1984 | PCT Int'l Appl. | |

OTHER PUBLICATIONS

"Methods of Conveying C-MAC/Packet Signals in Small and Large Community Antenna and Cable Networks Installations"; European Broadcasting Union Technical Centre; SPB 352, revised version; Feb. 1985.
"Television Standards for the Broadcasting Satellite Service Specification of the C-MAC/Packet System"; European Broadcasting Union Technical Centre; SPB 284, 4th revised version; Feb. 1985.

Primary Examiner—James J. Groody
Assistant Examiner—Michael D. Parker
Attorney, Agent, or Firm—Thomas A. Briody; William J. Streeter; Gregory P. Gadson

[57] ABSTRACT

Serial data from a C-MAC, D-MAC or D2-MAC television signal is applied over line (1) to a serial data to error conversion unit (2) which produces a 3-bit error signal when the applied data is compared with a W1 sync. word. The error signal is applied to comparators (6 and 7) whose other inputs receive a maximum or minimum error dependent signal to produce an output when the number of errors lies within certain requirements. These outputs are latched in a 2-bit latch (8) to produce line pulses on receipt of an acceptable sync. word at an appropriate time, the outputs of the latch (8) being applied to two shift registers (9 and 10). The shift registers (9 and 10) produce outputs P1, P2, P3, P4 over four line periods with the P3, P4 outputs of shift register (10) and the P1, P2 outputs of shift register (9) being applied to respective inputs of a first AND-gate (11) while the remaining outputs are applied to respective inputs of a second AND-gate (12) which gates produce an output when there is coincidence alternately at the end of each frame period. The outputs are applied to respective inputs of an OR-gate (13) to derive a frame flywheel and sync. acquisition unit (14) at frame frequency.

11 Claims, 3 Drawing Figures

METHOD AND APPARATUS FOR DERIVING FRAME INTERVAL SIGNALS

BACKGROUND OF THE INVENTION

The invention relates to a method of deriving signals at frame intervals from a received television signal which has two predetermined digital words which alternate line-by-line for a substantial part of a frame period of the television signal but which are each repeated in a respective pair of adjacent lines in the remaining part of the frame period, said method comprising comparing portions of each line period with one of the digital words and producing therefrom an error signal representing the number of bits in said portions which differ from said digital word and using said error signal to produce signals at frame intervals. The invention also relates to apparatus for use with this method.

The European Broadcasting Union documents "Television Standards for the Broadcasting Satellite Service Specification of the C-MAC/Packet System" SPB 284, 3rd revised edition dated December 1984, and "Methods of Conveying C-MAC/Packet Signals in Small and Large Community Antenna and Cable Network Installations" SPB 352, dated December 1984 describe three forms of television signal which are referred to as C-MAC, D-MAC and D2-MAC. For synchronising purposes each line of these signals carries one of the two digital sync. words W1 or W2 where W1 is of the form 001011 and W2 is the inverse, namely 110100. For a system having a frame comprising 625 lines, the sync. words alternate line-by-line for lines 1 to 621 whilst lines 622 and 623 both convey one sync. word whilst lines 624 and 625 both convey the other sync. word, this change in sync. word pattern indicating the end of a frame. For an odd frame line 1, and hence line 621 will convey the W2 sync. word whilst lines 622 and 623 will convey the W1 sync. word and lines 624 and 625 the W2 sync. word. This situation is the inverse for even frames such that line 1 conveys the W1 sync. word as will lines 624 and 625 whilst lines 622 and 623 will convey the W2 sync. word. PCT Patent Application No. WO84/02242 describes apparatus for obtaining line and frame synchronising signals from alternating digital sync. words but this is based on an earlier version of a specification for a C-MAC television signal where the two sync. words each had 7 bits whilst the pairs of lines using the same sync. words straddled the boundary between odd and even frames.

SUMMARY OF THE INVENTION

It is an object of the present invention to provide a different method and apparatus for obtaining signals at frame intervals which effectively requires less logic.

The present invention provides a method of deriving signals at frame intervals from a received television signal which has two predetermined digital words which alternate line-by-line for a substantial part of a frame period of the television signal but which are each repeated in a respective pair of adjacent lines in the remaining part of the frame period, said method comprising comparing portions of each line period with one of the digital words and producing therefrom an error signal representing the number of bits in said portions which differ from said one digital word, and using said error signals to produce signals at frame intervals, characterised in that in order to produce signals at frame intervals from said error signals the method further comprises comparing said error signals with a maximum number of permitted errors for each digital word and producing therefrom first and second detection signals for said first and second digital words when said errors are equal to or less than that permitted during a specified time in each line period, recording the resulting first and second detection signals over four line periods and detecting correspondence between a first pair out of said four line periods of said first detection signal with a different pair out of said four line periods of said second detection signal and also between the remaining ones out of the four line periods of said first and second detection signals to produce said signals at frame intervals.

The comparison of the error signal with a maximum of permitted errors for each digital word may be achieved by comparing the error signal with a maximum number of permitted errors for the said one digital word and with a maximum number of permitted errors for the other digital word, the latter being performed as a comparison with a minimum number of errors for the said one digital word. This avoids the need for the inversion of certain error signals.

The comparisons may be performed throughout each line period to produce indications that the maximum or less errors are present in the two digital words and which are then latched at said specified time in a line period when a true digital word should be present.

The invention also provides apparatus for use with the above method comprising means for comparing the serial data received in said television signal with one of said digital words to produce said error signal, characterised in that said apparatus further comprises means for comparing said error signal with a maximum number of permitted errors for one of said digital words and with a maximum number of permitted errors for the other digital word and for producing a first detection signal if at a specified time in a line period the number of errors is equal to or less than that for said one digital word and a second detection signal if at said specified time the number of errors is equal to or less than that for said other digital word, means for recording said first and second detection signals over four line periods, and means for detecting correspondence between a first pair out of said four line periods of said first detection signal with a different pair out of said four line periods of said second detection signal and also between the remaining ones out of the four line periods of said first and second detection signals to produce signals at frame intervals.

The means for comparing said error signal with a maximum number of permitted errors of the digital words may comprise first and second comparators whose respective first inputs receive the error signal specifying the number of errors when compared with said one digital word, the second input of said first comparator receiving a number corresponding to the maximum number of permitted errors in said one digital word and whose output produces said first detection signal, the second input of the second comparator receiving a number corresponding to a minimum number of permitted errors in said one digital word which corresponds to the maximum number of permitted errors in the other digital word, the output of the second comparator producing the second detection signal.

The first and second detection signals may be applied to respective inputs of a 2-bit latch which is enabled at said specified time in a line period to produce first and second latched outputs which are respectively applied to first and second shift registers each of which is capable of producing outputs over four line periods. The outputs for first and second line periods of said first shift register and for third and fourth line periods of said second shift register may be applied to respective inputs of a first AND-gate whilst the outputs for third and fourth line periods of said first shift register and for first and second line periods of said second shift register are applied to respective inputs of a second AND-gate, the first and second AND-gates alternately producing output signals at frame intervals. The first and second AND-gates may be applied to respective inputs of an OR-gate whose output is applied to control the operation of a frame frequency synchronising circuit.

BRIEF DESCRIPTION OF THE DRAWINGS

The above and other features of the invention will be more readily understood from the following description and the accompanying drawings in which.

DETAILED DESCRIPTION OF THE INVENTION

Figure 1:
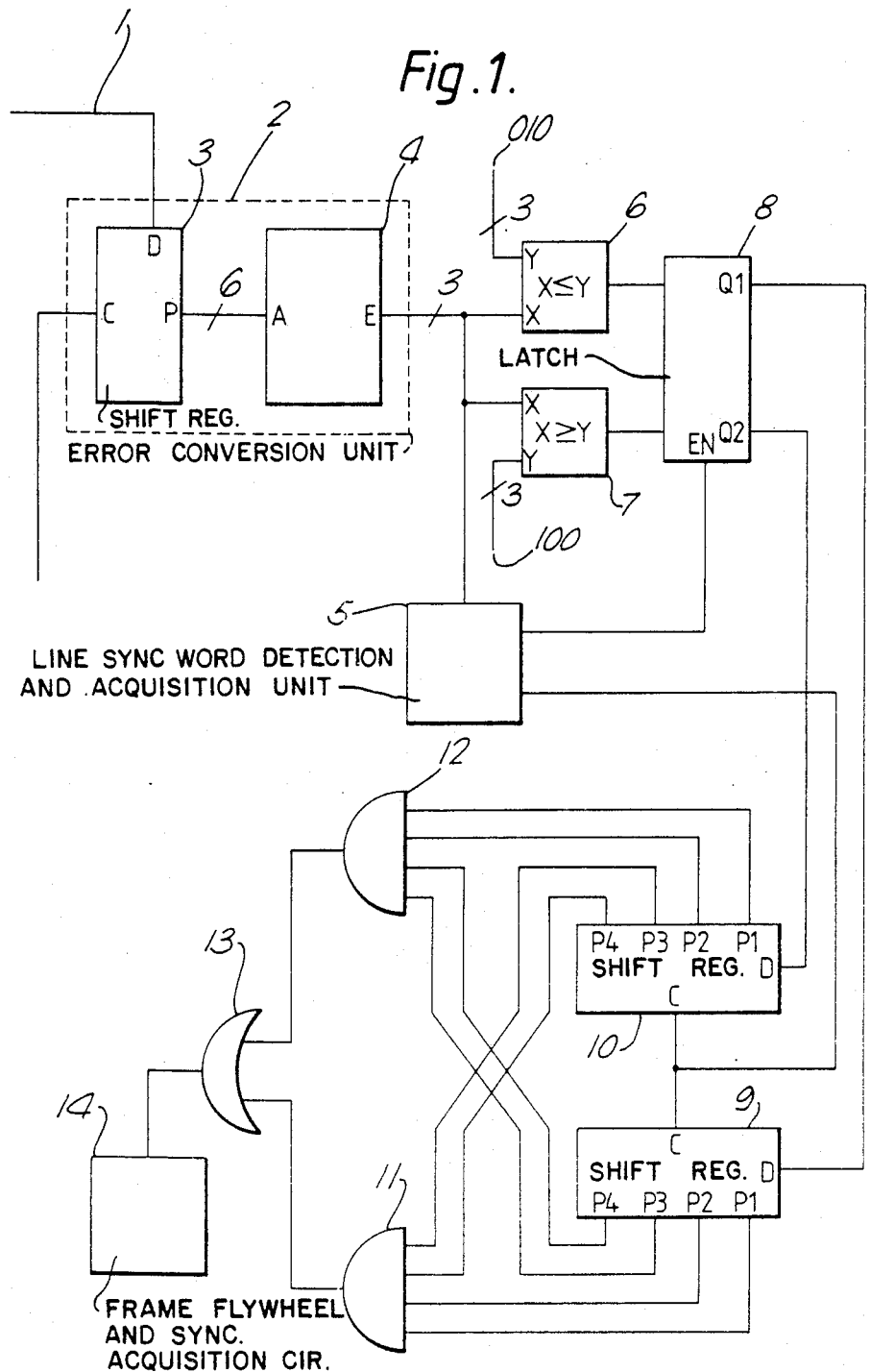
FIG. 1 is a block diagram of apparatus for use with the present invention.

In FIG. 1 the reference 1 indicates a serial data line over which, in the case of the C-MAC television system, the whole of the C-MAC television signal is applied in serial data form and which may be obtained from a received C-MAC transmission after limiting and demodulation in a 2–4 PSK demodulator stage (not shown). The serial binary data present on the line 1 will contain line-by-line the sync. word, the data burst and in addition what might be termed pseudo-random data due to the limited analogue compressed vision components. This serial data is applied to a serial data to an error conversion unit 2 in which the applied data is compared with one of the sync. words (in this case $W_1 = 001011$) and an error signal produced as a 3-bit binary number which indicates the number of errors present when six bits of the incoming serial data are compared with the fixed and chosen 6 bit sync. word. In the arrangement shown the unit 2 comprises a series-to-parallel converter in the form of a shift register 3 where the serial data from the line 1 is applied to a data input D which is clocked through the shift register under the control of a 20.25 MHz clock signal applied to a clock input C (which corresponds to the bit rate of the data in the C-MAC signal) to produce at the parallel outputs P a 6 bit data word which can change at the data bit rate. The changing 6-bit data is applied to the address input A of a 64×3 bit read only memory (ROM) 4 to produce at its output E the 3-bit error signal which represents the number of differences between that address and the chosen sync. word and again can change at the data bit rate. This error signal is applied to a line sync. word detection and acquisition unit 5 which from the error signal produces line synchronising signals for use in a television receiver in which the present arrangement may be included and may be of a number of forms including those shown and described in published PCT patent application No. WO84/02242.

The 3-bit error signal is additionally applied to respective first inputs X of a W1 comparator 6 and a W2 comparator 7. The second input Y of the W1 comparator 6 receives in parallel binary form a number corresponding to the maximum number of tolerable errors that may be present in a 6-bit word when compared with the W1 sync. word. The best value for this has been found to be two (binary 010) but a lower number of errors may be allowed during the initial lock-up procedure and a higher number thereafter. The second input Y of the W2 comparator 7 also receives a number in parallel binary form for comparing the number of tolerable errors in a W2 sync. word with a 6-bit word but as the error conversion unit acts on W1 sync. words only (which is the inverse of the W2 sync. word) the parallel binary number applied to the second input of the W2 comparator 7 corresponds to the minimum number of tolerable errors that may be present in a 6-bit word when compared with the W1 sync. word. The best value for this has been found to be four (binary 100) but it may be varied as described in relation to the W1 comparator. The W1 comparator 6 only produces a logic '1' output on each occasion when the number of errors at its first input X is less than or equal to 2 and similarly the W2 comparator 7 only produces a logic '1' output on each occasion when the number of errors at its first input X is greater than or equal to 4.

The outputs from the W1 and W2 comparators 6 and 7 form line sync. word detection signals which are applied to respective inputs of a 2-bit latch 8 whose enable input EN receives at line rate a pulse one bit (50 nS) wide from the line sync. word unit 5, this pulse appearing (ignoring transmission delays) such that it coincides with the last bit of each true line sync. word present on the serial data line 1 at which time the output of the unit 2 indicates the number of errors in that sync. word (W1 or W2). The latch 8 has two outputs Q1 and Q2 respectively associated with the outputs of the W1 and W2 comparators 6 and 7, the output Q1 latching to the same state as the output from W1 comparator 6 on the occurrence of the enable pulse. The Q2 output similarly latches to the same logic state as the output of the W2 comparator 7. Thus in the presence of a true W1 line sync. word at the input line 1 which has two or less errors in it the Q1 output latches to logic '1' and stays in that state until at a line interval or intervals later the number of errors is greater than 2 i.e. on the appearance of a true W2 sync. word or a W1 sync. word which has more than two errors. In a similar manner the Q2 output latches to the logic '1' state in the presence of a true W2 sync. word with two or less errors and stays in that state until a true W1 sync. word or a corrupted W2 sync. word appears.

The Q1 and Q2 outputs from the latch 8 are applied to respective data inputs D of 4-bit shift registers 9 and 10 in which the logic states present at these inputs during consecutive line periods are shifted through the shift register at line rate under the control of line frequency clock pulses applied to clock inputs C from the line sync. word unit 5 to successively appear one line apart at outputs P1, P2, P3, P4. The outputs P1, P2 of shift register 9 and the outputs P3, P4 of shift register 10 are applied to respective inputs of a first AND-gate 11 whilst the outputs P3, P4 of shift register 9 and the outputs P1, P2 of shift register 10 are applied to respective inputs of a second AND-gate 12. At the boundary between frames the alternate W1, W2 line sync. word pattern is changed such that for lines 622, 623, 624 and 625 in odd frames the sync. word pattern is W1, W1, W2, W2 whilst the pattern for the corresponding lines in even frames is W2, W2, W1, W1. Thus at the end of an odd frame the logic states of the outputs P1, P2, P3, P4 of shift register 9 will be respectively 0, 0, 1, 1, whilst those for the corresponding outputs of shift register 10 will be respectively 1, 1, 0, 0. Under these conditions the output of AND-gate 11 will be in the logic state '0' whilst the output of the AND-gate 12 will be in the logic state '1' for a line period coincident with the first line of the following even frame. At the end of an even frame the logic states for the outputs of the shift registers 9 and 10 will be opposite to that at the end of an odd frame, namely, for shift register 9 the outputs P1, P2, P3, P4 will be respectively 1, 1, 0, 0 whilst for shift register 10 the corresponding outputs will be respectively 0, 0, 1, 1. At such time the output of AND-gate 11 will go to the logic state '1' for a line period coincident with the first line of the following odd frame, whilst that of AND-gate 12 will remain in the logic state '0'. The outputs of the AND-gates 11 and 12 which may be respectively used to signal the end of an even or odd frame, are applied to respective inputs of an OR-gate 13 which gives the logic state '1' at the end of each frame period which is applied to the input of a frame flywheel and sync. acquisition circuit 14 for the generation of frame sync. pulses for use within the receiver.

Figure 2:
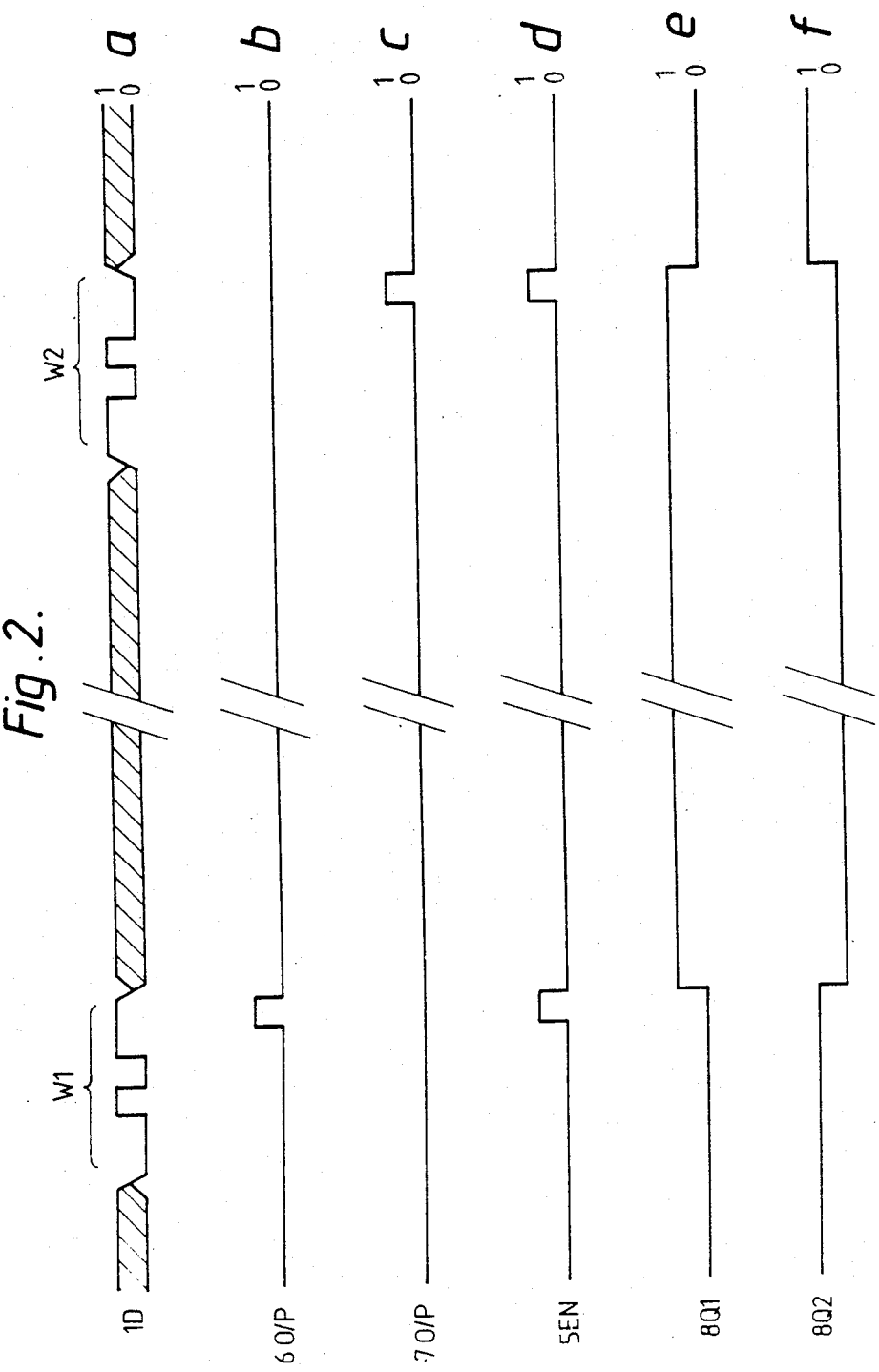
FIGS. 2 and 3 are timing diagrams for the operation of the apparatus of FIG. 1.
Figure 3:
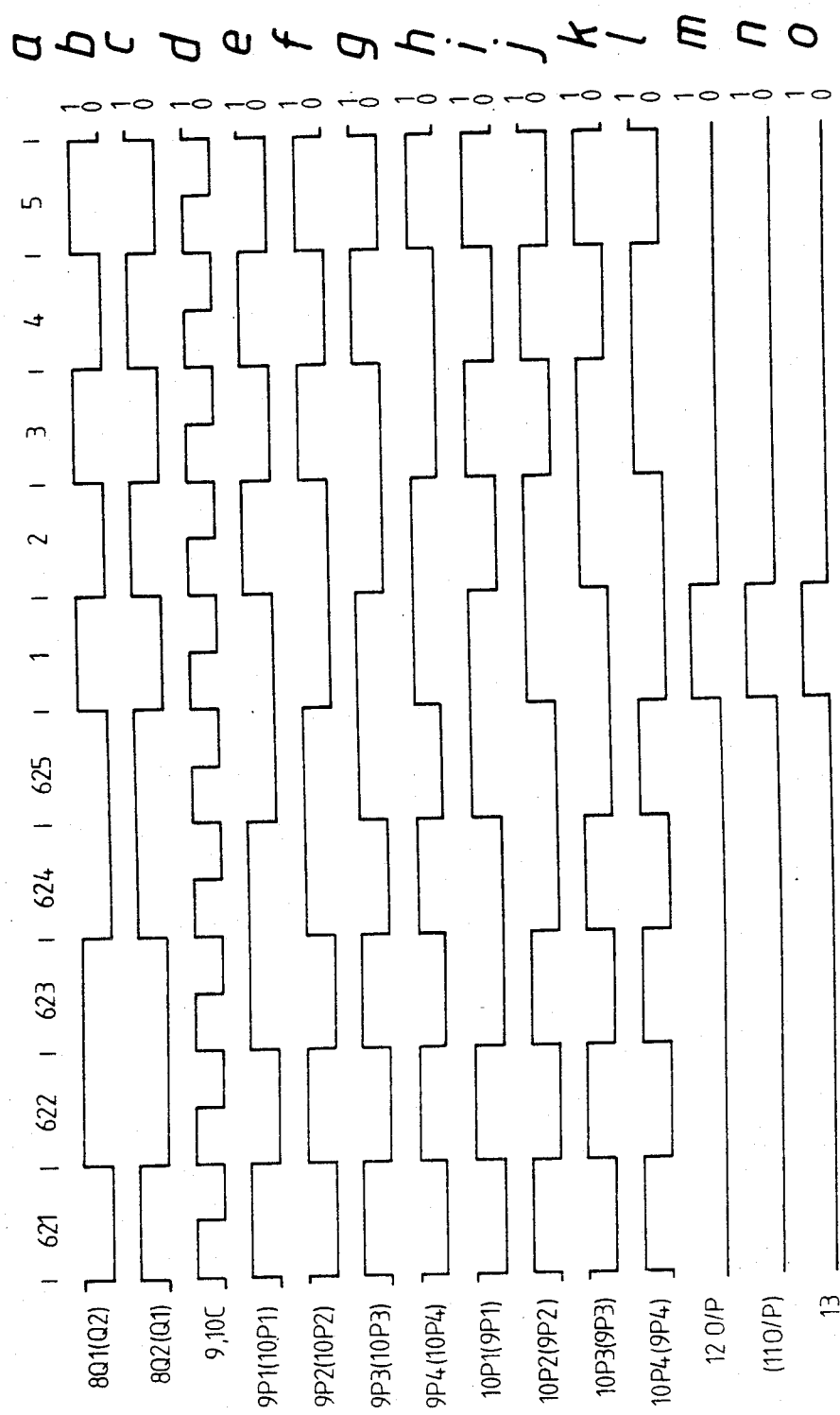

The operation of the arrangement of FIG. 1 will be better seen from the diagrams in FIGS. 2 and 3. FIG. 2a shows the input on line 1 containing data in serial form, this figure showing data present in two line periods and in particular around the start of the line periods. Of the two lines shown that on the left contains the W1 sync. word (001011) whilst that on the right contains the W2 sync. word (110100). The outputs from the W1 and W2 comparators 6 and 7 are shown respectively in FIGS. 2b and 2c for the receipt of sync. words with 2 or less errors, that from comparator 6 producing a single 50 nS pulse concident with the last bit of a W1 sync. word whilst that from comparator 7 produces a comparable pulse coincident with the last bit of a W2 sync. word. This output may also contain pulses at other times (not shown) when false line sync. words are detected in the serial data on line 1. FIG. 2d shows the line rate 50 nS pulses applied to the enable input EN of the latch 8 whilst the result of the latching action to produce pulses of line length is shown in FIGS. 2e and 2f where the FIG. 2e shows the ouput Q1 produced as a result of a true W1 sync. word and FIG. 2f the output Q2 produced as a result of a true W2 sync. word. These Q1 and Q2 outputs are shown over a ten line period in FIGS. 3b and 3c respectively, the line numbers being indicated in FIG. 3a from which it will be seen that the ten line periods are the five before the end and the five following the commencement of a frame. The outputs shown in FIGS. 3b and 3c are for the situation which occurs at the end of an odd frame where lines 622, 623, 624 and 625 respectively contain the sync. word sequence W1, W1, W2, W2. At the end of an even frame this sequence is W2, W2, W1, W1 and the output from Q1 would then be that of FIG. 3c and that from Q2 as in FIG. 3b, as indicated by the legends in brackets on the left of this Figure. The line rate clock pulses applied to the clock inputs C of shift registers 9 and 10 are shown in FIG. 3d whilst the time shifted outputs P1, P2, P3 and P4 from shift register 9 are respectively shown in FIGS. 3e, 3f, 3g and 3h and the corresponding outputs from shift register 10 are respectively shown in FIGS. 3i, 3j, 3k and 3l. The outputs shown in FIGS. 3e to 3l are for the end of an odd frame whilst those for the end of an even frame are as indicated in the legends in brackets on the left hand side of these figures. For an odd frame the only time that the outputs P3, P4 of shift register 9 and the outputs P1, P2 of shift register 10 are coincident with logic '1' is during line 1 of the following even frame whilst for an even frame the outputs P1, P2, of shift register 9 and P3, P4 of shift register 10 are coincident with logic '1' during line 1 of the following odd frame. These two conditions are respectively indicated in FIGS. 3m and 3n as the outputs of AND-gates 12 and 11 which each produce an output once every two frames. These outputs are applied to the OR-gate 13 to produce an output during each frame as shown in FIG. 3o.

In the above description the serial data applied to the input line 1 is that of a C-MAC television signal. The operation would be exactly the same if the applied data was from a D-MAC television signal. If the applied data were however derived from a D2-MAC television signal in which the data rate is half that of a C-MAC signal then the manner of operation would be the same save that the applied data on line 1, the error signal at the output E of ROM 4 and the outputs of the comparators 6 and 7 would be at the bit rate of 10.125 Mbits/s with a pulse width of approximately 100 nS and the line rate clock pulse to the enable input EN of latch 8 could have this pulse duration.

I claim:

1. A method of deriving signals at frame intervals from a received television signal which has two predetermined digital words which alternate line-by-line for a substantial part of a frame period of the television signal but which are each repeated in a respective pair of adjacent lines in the remaining part of the frame period, said method comprising the steps of comparing portions of each line period with one of the digital words and producing therefrom an error signal representing the number of bits in said portions which differ from said one digital word, and using said error signals to produce signals at frame intervals, characterized in that in order to produce said signals at frame intervals from said error signals the method further comprises comparing said error signals with a maximum number of permitted errors for each digital word and producing therefrom first and second detection signals for said first and second digital words when said errors are equal to or less than that permitted during a specified time in each line period, recording the resulting first and second detection signals over four line periods and detecting correspondence between a first pair out of said four line periods of said first detection signal with a different pair out of said four line periods of said second detection signal and also between the remaining ones out of the four line periods of said first and second detection signals to produce said signals at frame intervals.

2. A method as claimed in claim 1, characterized in that the step of comparing the error signals with a maximum of permitted errors for each digital word is achieved by comparing the error signals with a maximum number of permitted errors for said one digital word and with a maximum number of permitted errors for the other digital word, the latter being performed as a comparison with a minimum number of errors permitted for said one digital word.

3. A method as claimed in claim 2, characterized in that said comparing steps are performed throughout each line period to produce said first and second detection signals which are then latched at said specified time in a line period when a true digital word should be present.

4. Apparatus for deriving signals at frame intervals from a received television signal which has two predetermined digital words which alternate line-by-line for a substantial part of a frame period of the television signal but which are each repeated in a respective pair of adjacent lines in the remaining part of the frame period, said apparatus comprising means for comparing portions of each line period received in said television signal with one of said digital words to produce an error signal representing the number of bits in said portions which differ from said one digital word, characterized in that said apparatus further comprises means for comparing said error signal with a maximum number of permitted errors for one of said digital words and with a maximum number of permitted errors for the other digital word and for producing a first detection signal if at a specified time in a line period the number of errors is equal to or less than that for said one digital word and a second detection signal if at said specified time the number of errors is equal to or less than that for said other digital word, means for recording said first and second detection signals over four line periods, and means for detecting correspondence between a first pair out of said four line periods of said first detection signal with a different pair out of said four line periods of said second detection signal and also between the remaining ones out of the four line periods of said first and second detection signals to produce signals at frame intervals.

5. Apparatus as claimed in claim 4, characterized in that the means for comparing said error signal with a maximum number of permitted errors of the digital words comprises first and second comparators whose respective first inputs receive the error signal specifying the number of errors when compared with said one digital word, the second input of said first comparator receiving a number corresponding to the maximum number of permitted errors in said one digital word and whose output produces said first detection signal, the second input of the second comparator receiving a number corresponding to a minimum number of permitted errors in said one digital word which corresponds to the maximum number of permitted errors in the other digital word, the output of the second comparator producing the second detection signal.

6. Apparatus as claimed in claim 4, characterized in that said first and second detection signals are applied to respective inputs of a 2-bit latch which is enabled at said specified time in a line period to produce first and second latched outputs which are respectively applied to first and second shift registers each of which is capable of producing outputs over four line periods.

7. Apparatus as claimed in claim 6, characterized in that the outputs for first and second line periods of said first shift register and for third and fourth line periods of said second shift register are applied to respective inputs of a first AND-gate while the outputs for third and fourth line periods of said first shift register and for first and second line periods of said second shift register are applied to respective inputs of a second AND-gate, the first and second AND-gates alternately producing output signals at frame intervals.

8. Apparatus as claimed in claim 7, characterized in that the outputs of the first and second AND-gates are applied to respective inputs of an OR-gate whose output is applied to control the operation of a frame frequency synchronizing circuit.

9. Apparatus as claimed in claim 5, characterized in that said first and second detection signals are applied to respective inputs of a 2-bit latch which is enabled at said specified time in a line period to produce first and second latched outputs which are respectively applied to first and second shift registers each of which is capable of producing outputs over four line periods.

10. Apparatus as claimed in claim 9, characterized in that the outputs for first and second line periods of said first shift register and for third and fourth line periods of said second shift register are applied to respective inputs of a first AND-gate while the outputs for third and fourth line periods of said first shift register and for first and second line periods of said second shift register are applied to respective inputs of a second AND-gate, the first and second AND-gates alternately producing output signals at frame intervals.

11. Apparatus as claimed in claim 10, characterized in that the outputs of the first and second AND-gates are applied to respective inputs of an OR-gate whose output is applied to control the operation of a frame frequency synchronizing circuit.

* * * * *